United States Patent Office 3,502,918
Patented Mar. 24, 1970

3,502,918
ELECTRIC MOTORS
Clifford Graham Done, Eric Ronald Casey, and Edward Pearson, Bradford, England, assignors to The English Electric Company Limited, London, England, a British company
Filed Feb. 16, 1968, Ser. No. 706,115
Int. Cl. H02k 7/102
U.S. Cl. 310—77                    5 Claims

ABSTRACT OF THE DISCLOSURE

A squirrel cage induction motor has a brake mechanism which is biassed to the "on" position and is axially movable relative to the rotor to disengage the brake. The brake is initially disengaged by electromagnetic forces produced by current flowing in the rotor windings and in one of the end rings when the motor is first energized for operation. These forces decrease as the motor runs up to speed, and the brake mechanism is thereafter held disengaged by electromagnetic forces produced in the rotor.

---

This invention relates to electric induction motors of the kind which have a squirrel cage rotor winding with end rings and a brake mechanism which is automatically released from the braking position when the rotor is energised for operation and which is automatically returned to the braking position by resilient biassing means when the motor is de-energised.

More particularly the invention relates to the kind of motor in which the brake mechanism is axially movable relative to the rotor by means of electromagnetic forces established when the motor is energised for operation.

According to the invention an induction motor includes a shaft; a rotor mounted on said shaft and having a core and a squirrel cage winding with end rings; braking means biassed into a braking position and movable away from said braking position in a direction axial to said rotor; first disengaging means to move said braking means away from said braking position in response to electromagnetic forces produced by current in said winding and in one of said end rings during initial energisation of the motor; and second disengaging means to retain said braking means away from said braking position in response to electromagnetic forces produced in said rotor after said initial energisation.

In order that the invention may be better understood, one embodiment thereof will now be described, by way of example, with reference to the accompanying diagrammatic drawings, in which:

FIGURE 1 shows details of the non-drive end of the motor which has a frame 10 in which is mounted laminated stator core 11, the core having a cylindrical bore. Details of the stator winding are not shown but the winding end turns are shown at 12.

Figure 1:
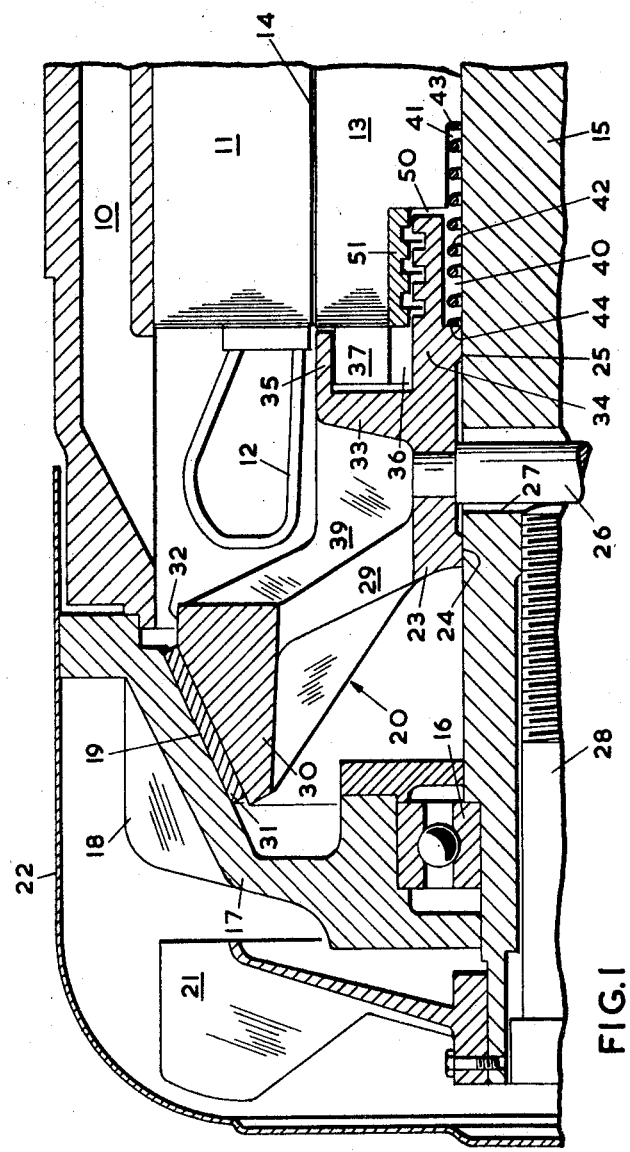
FIGURE 1 is a section through part of the non-drive end of the motor showing the brake mechanism in the "on" position.

The rotor of the motor is generally indicated at 13 and is spaced from the stator by an air gap 14. The rotor is rigidly mounted on a shaft 15 and is supported for rotation in bearings one of which is shown at 16. The bearing 16 is carried by an end plate 17 which is secured to the frame 10 by means not shown.

The rotor has a squirrel cage winding (not shown) with interconnecting end rings but the non-drive end ring is shown at 37.

The end of the rotor is formed with an annular recess 50 in which is secured an annulus of magnetic material 51 more fully described later.

The end plate 17 is formed with a number of external cooling ribs one of which is shown at 18 and the inner face of the end plate is formed with a braking surface 19 for co-operation with a brake mechanism generally indicated at 20 and more fully described later.

Mounted on the end of the shaft 15 is a fan shown in part at 21 and arranged to draw air in through a cowl 22 and blow out over the motor frame.

The brake mechanism 20 includes a number of parts which extend from a sleeve 23 the internal surface of which is recessed to leave two annular surfaces 24 and 25 which provide bearing surfaces on which the sleeve is axially slidable along the motor shaft 15. Movement of the sleeve 23 along the shaft 15 is limited by a pin 26 which is mounted in the sleeve 23 and the pin projects into an aperture 27 in the shaft 15.

The aperture 27 extends generally radially into the shaft 15 and is axially elongated.

The pin 26 also serves to transmit the braking force from the brake mechanism to the rotor of the motor.

The operating position of the brake 20 is set by a screw 28 axially threaded into the shaft and this screw may also be adjusted so as to put the brake mechanism out of operation by moving the brake mechanism to its disengaged position.

Projecting generally radially from the sleeve 23 are a number of spaced arms one of which is shown at 29 and the outer ends of these arms support the brake proper. This comprises an annular member 30 of generally wedge shape section, on the outer surface of which is mounted a brake or friction element 31 which co-operates with the braking surface 19 on the end plate 17. The edge 32 of the annular member projects close to the opposed inner face of the frame 10 so as to leave only a small annular air gap between these two parts whereby to form a seal which will prevent any foreign matter from entering the machine.

At its other end the sleeve 23 has two projecting parts, namely a radially extending annular flange 33 of magnetic material and an axially extending cylindrical portion 34 also of magnetic material. The flange 33 also has an axially extending annular portion 35 of magnetic material extending therefrom. The annular portion 35 extends towards the end of the rotor 13 leaving only a small air gap A between these two parts. It will be seen that parts 33, 34 and 35 together define an annular groove 36 into which the end ring 37 projects.

Whilst the parts 33, 34 and 35 have been described as being of magnetic material and are shown as integral parts of the sleeve 23 they could in fact comprise one or more separate parts carried by the sleeve provided they are of the required magnetic material. Similarly the arms 29 and annulus 30 can be separate parts secured to the sleeve 23.

Extending between part 33 and the ribs 29 and the annular member 30 are a number of webs such, for example, as are shown at 39 and these webs act to circulate air around the end turns 12 for cooling purposes.

The cylindrical portion 34 extends into the interior of the annular recess 50 of the rotor 15 and has an internally enlarged bore portion 40 which together with a similarly enlarged bore portion 41 in the rotor accommodate a helical spring 42.

Both the enlarged bore portions 40 and 41 provide at their ends stop surfaces 43 and 44 respectively between which the spring 42 is compressed so that when the motor is not energised the brake mechanism 20 is biased to its braking position.

Figure 2:
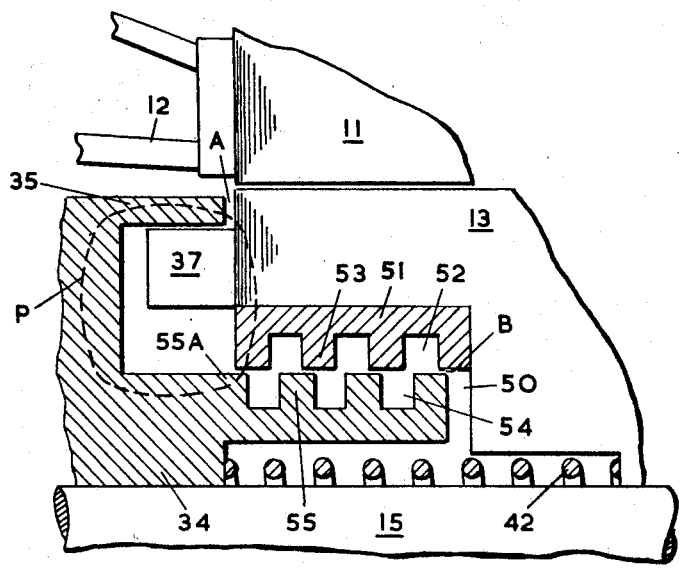
FIGURE 2 is an enlarged view of part of FIGURE 1.

The construction of the end of the cylindrical portion 34 and the opposed part of the rotor can best be seen in FIGURE 2 which shows these parts enlarged and in the same position as in FIGURE 1, that is, with the brake mechanism in the braking position.

The sleeve 51 of magnetic material is formed with three annular grooves one of which is indicated at 52 so as to leave four projecting annular ribs as shown at 53. The end of the cylindrical portion 34 is formed with similar grooves 54 so as to leave three complete projecting ribs 55 and effectively a fourth rib 55A formed by the end of the sleeve.

The ribs on the cylindrical portion 34 and on the sleeve 51 are axially spaced apart a similar amount and are separated by an air gap B.

Operation of the brake mechanism is as follows. At the instant the stator windings are energised with the rotor at rest, a heavy current will circulate in the rotor cage and end ring 37. The resultant magnetic field around the end ring will be in paths such as shown at P in broken lines in FIGURE 2. This path is in the magnetic material of the cylindrical portion 34 and will thus set up an attractive force across the air gap A. When this force exceeds the force exerted by the spring 42 the whole brake mechanism 20 will move axially towards the rotor core 13 thus disengaging the brake and allowing the rotor to accelerate.

As the rotor accelerates the current in the end ring will fall away but at the same time a magnetic flux will have built up across the opposed annular ribs 53, 55 of the rotor and sleeve cylindrical portion 34 respectively. This flux which passes across the air gap B will tend to maintain the brake mechanism in its disengaged position so that the rotor can further accelerate towards its full speed.

Figure 3:
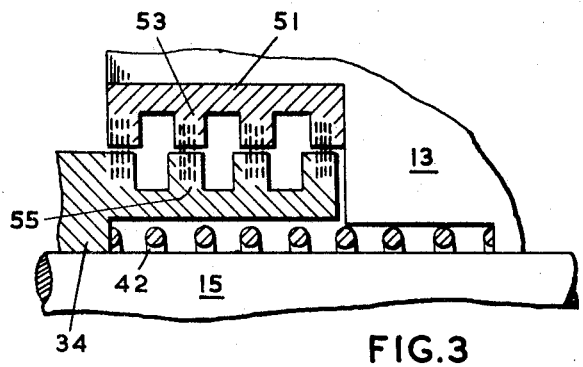
FIGURE 3 is an enlarged view of part of the FIGURES 1 and 2 but showing part of the brake mechanism in the "off" position.

Under these conditions the current in the rotor winding will fall but at the same time the magnetic flux built up in the motor will penetrate more deeply into the rotor until a substantial magnetic flux will be established across the opposed ribs 53, 55. This flux will cause the teeth 53 and 55 to fall into alignment so as to move the brake mechanism further towards the rotor core. Ultimately the ribs 53 and 55 will take up the position shown in FIGURE 3 with the brake mechanism held in its off position.

When the stator winding is de-energized the brake mechanism will be reelased to move to its braking position under the biassing force of the spring 42.

Whilst the invention has been described in relation to an arrangement having four ribs 53 and a total of four ribs 55 and 55A any desired number of such ribs could be provided. Also the ribs need not be completely annular, they could be discontinuous so as to be in the form of a series of teeth or projections.

Various modifications of the arrangements for biassing the brake mechanism to its braking position are possible and these modifications which are set out below could either replace the arrangement of the spring 42 or could be used in conjunction therewith. Similarly these modifications could be used in conjunction with one another with or without the spring 42.

In one modification helical springs are carried in the annular flange 33 to exert pressure against the rotor end ring 37. Alternatively helical springs can be carried between the ribs 29 and annular flange 33 with the springs projecting through the flange 33 to exert pressure against the end ring 37 or with plungers passing through the end ring 37 to exert pressure upon the end ring 37.

In a further modification the motor shaft 15 can be provided with an annular flange adjacent the bearing 16 and helical springs arranged between such flange and the brake mechanism to pull the brake mechanism towards its braking position.

In the above described modifications the helical springs are arranged symmetrically and a convenient number of such springs would be six.

A similar arrangement of, for example, six springs could also be used to replace the single spring 42 with the six springs arranged to extend axially along the rotor shaft in substantially the same location as the spring 42 but accommodated in a somewhat larger annular space.

Obviously other resilient biassing means could be used instead of helical springs such, for example, as an elastomeric material or a number of Belleville washers.

We claim:

1. An induction motor including a shaft; a rotor mounted on said shaft and having a laminated core and a squirrel cage winding with end rings; a friction brake mechanism axially movable relative to the rotor core so as to be movable into and out of the braking position; means for resiliently biasing the braking mechanism towards the braking position; and brake disengagement means for moving the brake mechanism away from the braking position upon energisation of the motor; the brake disengaging means comprising a first magnetisable portion responsive to electromagnetic forces produced by current in said winding and in one of said end rings during initial energisation of the motor, and a second magnetisable portion which extends into the interior of the rotor core and which retains said braking mechanism away from said braking position in response to electromagnetic forces established within the rotor core as the rotor accelerates to and reaches its full speed.

2. An industion motor according to claim 1 in which the friction brake mechanism includes a sleeve slidably mounted on the shaft, one end of the sleeve carrying part of the friction brake mechanism and the other end of the sleeve carrying the first and second magnetisable portions of the brake disengaging means.

3. An induction motor according to claim 2 in which the rotor core laminations adjacent the end ring define an annular recess about the shaft within the rotor core, and including an annular magnetisable body formed with a plurality of internally projecting annular ribs disposed within the annular recess, the second magnetisable portion of the brake disengaging means which extends into the rotor core comprising a second annular magnetisable body spaced from the rotor shaft and having similar but externally projecting annular ribs spaced from and opposed to the internally projecting annular ribs.

4. An induction motor according to claim 2 including a generally radial aperture in said shaft, and a pin attached to said sleeve and extending into said aperture to limit movement of said sleeve and to transmit braking force from said part of the friction braking mechanism to said rotor.

5. A motor according to claim 2, including manually-operated means to adjust the position of said sleeve along said shaft.

References Cited

UNITED STATES PATENTS

| 2,694,781 | 11/1954 | Hinz | 310—77 |
| 2,802,121 | 8/1957 | Sorchy | 310—77 |
| 2,879,417 | 4/1959 | Sorchy | 310—77 |
| 3,028,512 | 4/1962 | Sorchy | 310—77 |
| 3,032,667 | 5/1962 | Sorchy | 310—77 |
| 3,048,723 | 8/1962 | Watson | 310—77 |
| 3,407,319 | 10/1968 | Arraiza | 310—77 |

MILTON O. HIRSHFIELD, Primary Examiner

M. O. BUDD, Assistant Examiner